US012700075B2

(12) United States Patent
Zhu et al.

(10) Patent No.: US 12,700,075 B2
(45) Date of Patent: Aug. 4, 2026

(54) IMAGE QUALITY EVALUATION METHOD AND APPARATUS, DEVICE AND STORAGE MEDIUM

(71) Applicant: BOE Technology Group Co., Ltd., Beijing (CN)

(72) Inventors: Dan Zhu, Beijing (CN); Ran Duan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 187 days.

(21) Appl. No.: 18/709,800

(22) PCT Filed: Jul. 31, 2023

(86) PCT No.: PCT/CN2023/110329
§ 371 (c)(1),
(2) Date: May 13, 2024

(87) PCT Pub. No.: WO2024/027660
PCT Pub. Date: Feb. 8, 2024

(65) Prior Publication Data
US 2025/0014160 A1 Jan. 9, 2025

(30) Foreign Application Priority Data
Aug. 2, 2022 (CN) .......................... 202210923874.9

(51) Int. Cl.
*G06T 7/00* (2017.01)
*G06T 5/20* (2006.01)
(Continued)

(52) U.S. Cl.
CPC ............. *G06T 7/0002* (2013.01); *G06T 5/20* (2013.01); *G06T 5/50* (2013.01); *G06T 5/77* (2024.01);
(Continued)

(58) Field of Classification Search
CPC ....... G06T 7/0002; G06T 7/74; G06T 7/0004; G06T 5/77; G06T 5/20; G06T 5/50;
(Continued)

(56) References Cited

U.S. PATENT DOCUMENTS 12,327,367 B2 * 6/2025 Cho ........................ G06T 7/593
12,340,484 B2 * 6/2025 Liu ....................... G06T 3/4038
(Continued)

FOREIGN PATENT DOCUMENTS

CN 109255390 A 1/2019
CN 107959848 B 12/2019
(Continued)

OTHER PUBLICATIONS

PCT/CN2023/110329 international search report dated Oct. 27, 2023.
PCT/CN2023/110329 Written Opinion dated Oct. 27, 2023.

*Primary Examiner* — Rasha S Al Aubaidi
(74) *Attorney, Agent, or Firm* — IPro, PLLC

(57) ABSTRACT

The present application discloses an image quality evaluation method and apparatus, a device, and a storage medium. The method includes: acquiring a to-be-evaluated image; and inputting the to-be-evaluated image into an image quality evaluation network to obtain an image quality evaluation result, where the image quality evaluation network is configured to extract a first image feature from an input image, perform a shift operation on the first image feature to acquire one or more second image features, and determine the image quality evaluation result by combining the first image feature and the acquired second image features; a size of each of the second image features is the same as a size of the first image feature, and regions with identical values of features exist in different positions between the first image feature and the second image features.

11 Claims, 7 Drawing Sheets

(51) Int. Cl.

| | |
|---|---|
| *G06T 5/50* | (2006.01) |
| *G06T 5/77* | (2024.01) |
| *G06T 7/73* | (2017.01) |

(52) U.S. Cl.
CPC ...... *G06T 7/74* (2017.01); *G06T 2207/10016* (2013.01); *G06T 2207/20081* (2013.01); *G06T 2207/20212* (2013.01); *G06T 2207/30168* (2013.01)

(58) Field of Classification Search
CPC . G06T 2207/10032; G06T 11/00; G06T 7/00; G06V 10/40; G06V 10/44; G06V 10/454; G06V 10/70; G06N 3/464; G06N 3/08; G06N 3/09
USPC .............................. 382/190; 706/46; 345/619
See application file for complete search history.

(56) References Cited

U.S. PATENT DOCUMENTS

| | | | |
|---|---|---|---|
| 2006/0204120 A1 | 9/2006 | Poon et al. | |
| 2017/0366327 A1* | 12/2017 | Kim | H04H 20/33 |
| 2019/0228547 A1* | 7/2019 | Chandarana | G01R 33/5608 |
| 2019/0242368 A1* | 8/2019 | Wang | F03G 1/06 |
| 2020/0410636 A1* | 12/2020 | Kim | G06T 3/4015 |
| 2022/0366588 A1* | 11/2022 | Cho | G06V 10/82 |
| 2023/0306719 A1* | 9/2023 | Guo | G06N 3/0464 |

FOREIGN PATENT DOCUMENTS

| | | |
|---|---|---|
| CN | 110717851 A | 1/2020 |
| CN | 112164102 A | 1/2021 |
| CN | 112950581 A | 6/2021 |
| CN | 115170552 A | 10/2022 |

\* cited by examiner

Space feature extraction network

IMAGE QUALITY EVALUATION METHOD AND APPARATUS, DEVICE AND STORAGE MEDIUM

CROSS-REFERENCE TO RELATED APPLICATIONS

This application is a national stage of international PCT Application No. PCT/CN2023/110329 filed on Jul. 31, 2023, the entire contents of which are incorporated herein by reference.

TECHNICAL FIELD

The present invention relates to the field of computer application technologies, and in particular, to an image quality evaluation method and apparatus, a device and a storage medium.

BACKGROUND

Currently, when image quality is evaluated, it is often manually evaluated. For example, the image quality is scored manually, and then the image quality is determined through scores.

Images may be specifically video frames, so that the quality of a video may be determined by evaluating the quality of the video frames. However, such manual evaluation method is less efficient.

SUMMARY

The present invention provides an image quality evaluation method and apparatus, a device and a storage medium to solve the deficiencies in the related art.

According to a first aspect of the embodiments of the present invention, there is provided an image quality evaluation method, including:

acquiring a to-be-evaluated image; and inputting the to-be-evaluated image into an image quality evaluation network to obtain an image quality evaluation result, where the image quality evaluation network is configured to extract a first image feature from the input image, perform a shift operation on the first image feature to acquire one or more second image features, and determine the image quality evaluation result by combining the first image feature and the acquired second image features;

where a size of each of the second image features is the same as a size of the first image feature, and regions with identical values of features exist in different positions between the first image feature and the second image features.

In some embodiments, determining the image quality evaluation result by combining the first image feature and the acquired second image features includes:

determining one or more image attribute evaluation results by combining the first image feature and the acquired second image features;

determining the image quality evaluation result according to the determined image attribute evaluation results.

In some embodiments, the image quality evaluation network includes N cascaded predetermined modules, where $N \geq 2$; for an $i^{th}$ predetermined module, $1 \leq i \leq N-1$, and an output of the $i^{th}$ predetermined module is cascaded to an input of an $(i+1)^{th}$ predetermined module;

the predetermined modules are configured to perform a shift operation on an input image feature to acquire one or more third image features, and further extract image features by combining the input image feature and the acquired third image features and output the image features, where a size of each of the third image features is the same as a size of the input image feature, and regions with identical values of features exist in different positions between the input image feature and the third image features;

performing the shift operation on the first image feature to acquire the one or more second image features, and determining the image quality evaluation result by combining the first image feature and the acquired second image features includes:

inputting the first image feature into a first predetermined module in the N cascaded predetermined modules to obtain an image feature output from an $N^{th}$ predetermined module; and determining the image quality evaluation result according to the image feature output from the $N^{th}$ predetermined module.

In some embodiments, performing the shift operation on the first image feature to acquire the one or more second image features includes:

performing a shift operation on features in a predetermined region in the first image feature to obtain one or more shift results; and filling a predetermined value for a default part in each of the one or more shift results to acquire the one or more second image features each having the same size as the first image features.

In some embodiments, determining the image quality evaluation result by combining the first image feature and the acquired second image features includes:

further extracting space feature information of the image by combining the first image feature and the acquired second image features, and determining the image quality evaluation result according to the extracted space feature information.

In some embodiments, the first image feature includes at least one of: an image detail feature, an image noise feature, or an image global feature.

In some embodiments, extracting the first image feature from the input image includes:

acquiring predetermined information from the input image, and further extracting one or more image features from the predetermined information; and adding the extracted image features to the first image feature;

where the predetermined information includes at least one of: an original image, image detail information, image noise information, image luminance information, image saturation information, or image hue information.

In some embodiments, acquiring the predetermined information from the input image includes:

performing edge filtering on the input image to extract the image detail information; and/or performing guided filtering on the input image to obtain a denoised blurred image, and extracting the image noise information by combining the input image and the blurred image.

In some embodiments, further extracting one or more image feature from the predetermined information includes:

extracting one or more image features from different predetermined information by using different feature extraction networks.

In some embodiments, a training set of the image quality evaluation network is generated by:

acquiring an unlabeled image sample;

for the unlabeled image sample, calculating one or more corresponding image attribute values; and determining a corresponding image quality evaluation label according to the calculation result.

According to a second aspect of the embodiments of the present invention, there is provided an image quality evaluation apparatus, including:

an acquisition unit, configured to acquire a to-be-evaluated image; and an evaluation unit, configured to input the to-be-evaluated image into an image quality evaluation network to obtain an image quality evaluation result, where the image quality evaluation network is configured to extract a first image feature from the input image, perform a shift operation on the first image feature to acquire one or more second image features, and determine the image quality evaluation result by combining the first image feature and the acquired second image features;

a size of each of the second image features is the same as a size of the first image feature, and regions with identical values of features exist in different positions between the first image feature and the second image features.

In some embodiments, the image quality evaluation network is configured to: determine one or more image attribute evaluation results by combining the first image feature and the acquired second image features; determine the image quality evaluation result according to the determined image attribute evaluation results.

In some embodiments, the image quality evaluation network includes N cascaded predetermined modules, where $N \geq 2$; for an $i^{th}$ predetermined module, $1 \leq i \leq N-1$, and an output of the $i^{th}$ predetermined module is cascaded to an input of an $(i+1)^{th}$ predetermined module;

the predetermined modules are configured to perform a shift operation on an input image feature to acquire one or more third image features, and further extract image features by combining the input image feature and the acquired third image features and output the image features, where a size of each of the third image features is the same as a size of the input image feature, and regions with identical values of features exist in different positions between the input image feature and the third image features;

the image quality evaluation network is configured to: input the first image feature into a first predetermined module in the N cascaded predetermined modules to obtain an image feature output from an $N^{th}$ predetermined module; determine the image quality evaluation result according to the image feature output from the $N^{th}$ predetermined module.

In some embodiments, the image quality evaluation network is configured to: perform a shift operation on features in a predetermined region in the first image feature to obtain one or more shift results; and fill a predetermined value for a default part in each of the one or more shift results to acquire the one or more second image features each having the same size as the first image feature.

In some embodiments, the image quality evaluation network is configured to: further extract space feature information of the image by combining the first image feature and the acquired second image features, and determine the image quality evaluation result according to the extracted space feature information.

In some embodiments, the first image feature includes at least one of: an image detail feature, an image noise feature, or an image global feature.

In some embodiments, the image quality evaluation network is configured to: acquire predetermined information from the input image, and further extract one or more image features from the predetermined information; and add the extracted image features to the first image feature, where the predetermined information includes at least one of: an original image, image detail information, image noise information, image luminance information, image saturation information, or image hue information.

In some embodiments, the image quality evaluation network is configured to:

perform edge filtering on the input image to extract the image detail information; and/or perform guided filtering on the input image to obtain a denoised blurred image, and extract the image noise information by combining the input image and the blurred image.

In some embodiments, the image quality evaluation network is configured to: extract one or more image features from different predetermined information by using different feature extraction networks.

In some embodiments, a training set of the image quality evaluation network is generated by:

acquiring an unlabeled image sample;

for the unlabeled image sample, calculating one or more corresponding image attribute values; and determining a corresponding image quality evaluation label according to the calculation result.

According to a third aspect of the embodiments of the present invention, there is provided an electronic device, including:

at least one processor; and a memory connected in communication with the at least one processor, where the memory stores instructions executable by the at least one processor to enable the at least one processor to implement any one of the method embodiments.

According to a fourth aspect of the embodiments of the present invention, there is provided a computer readable storage medium storing a computer program, where the computer program is executed by a processor to implement any one of the method embodiments.

As can be known from the above embodiments, quality evaluation may be automatically performed on the input image by using a pre-trained image quality evaluation network, which improves the efficiency of quality evaluation, and reduce the labor cost.

It should be understood that the above general description and the following detailed description are only exemplary and explanatory and are not restrictive of the present invention.

BRIEF DESCRIPTION OF DRAWINGS

The accompanying drawings, which are incorporated in and constitute a part of this specification, illustrate examples consistent with the present invention and, together with the description, serve to explain the principle of the invention.

5

6

Figure 1:
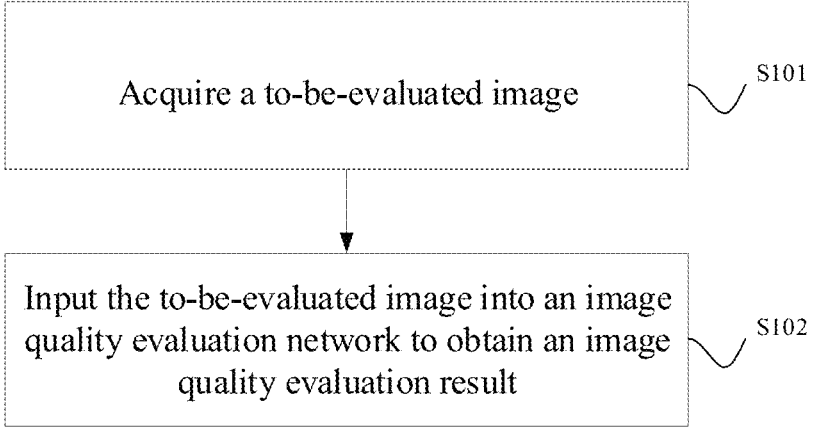
Figure 2:
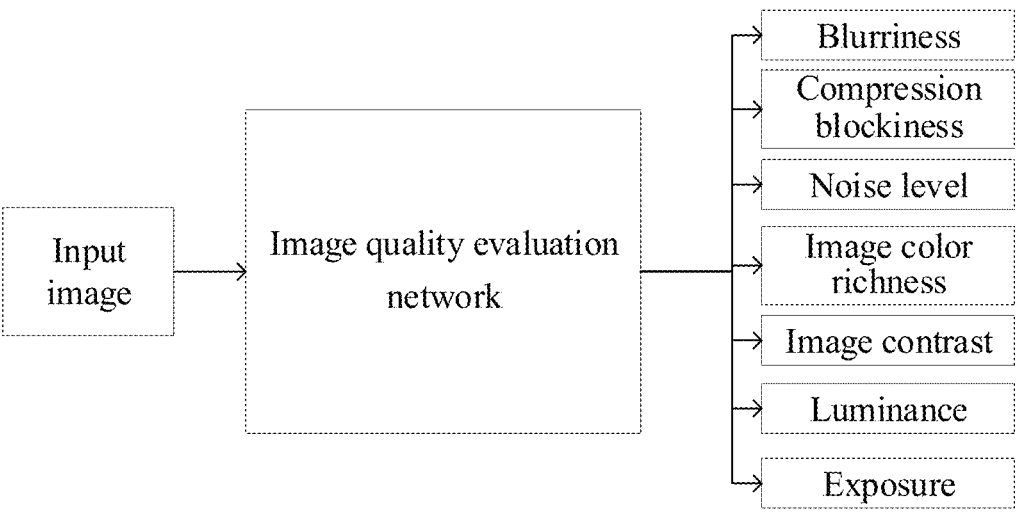
Figure 3:
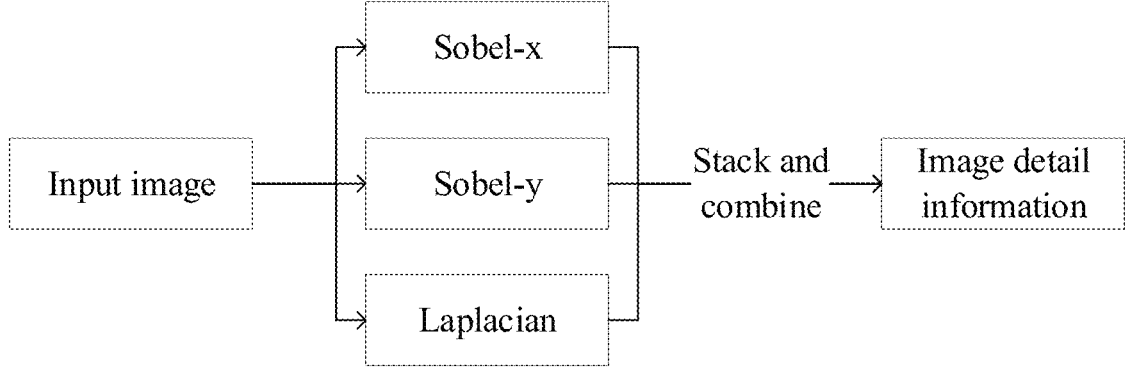
Figure 4:
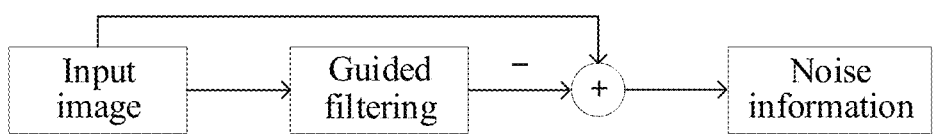
Figure 5:
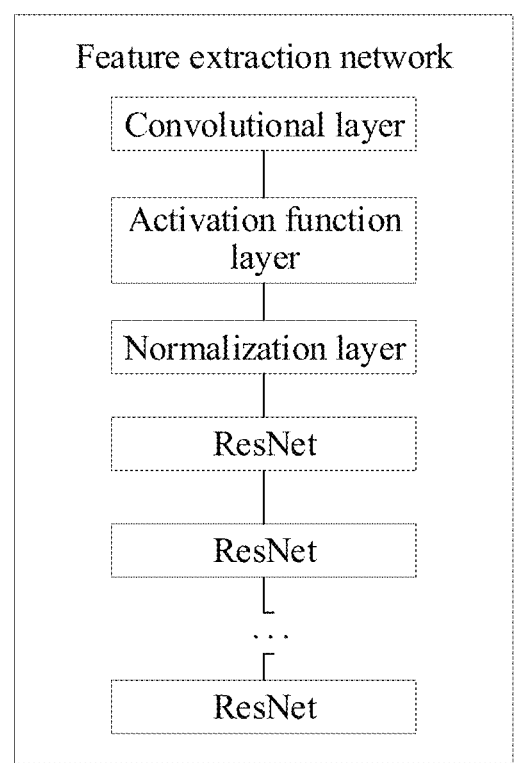
Figure 6:
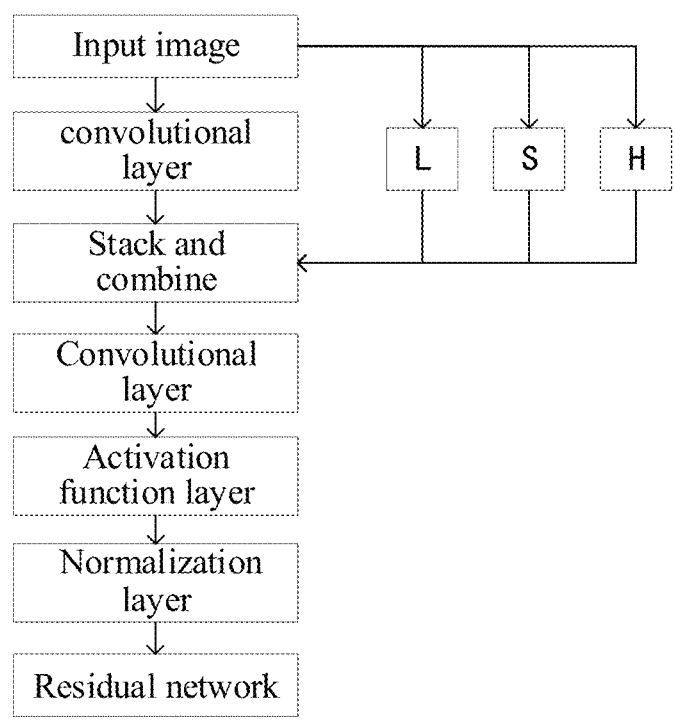
Figure 7:
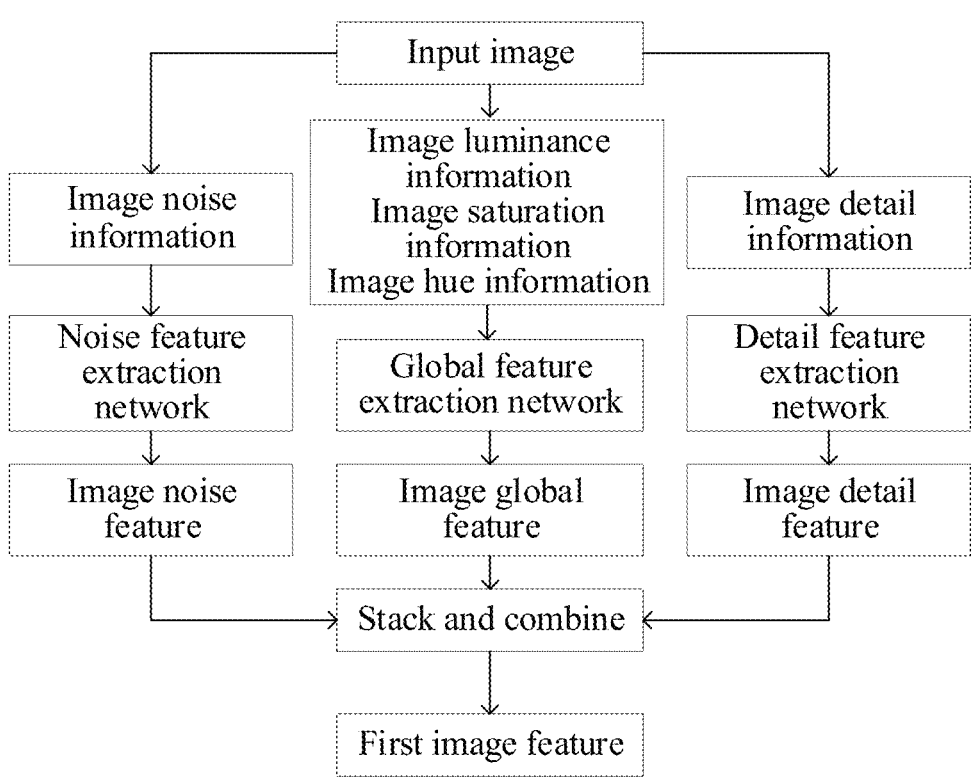
Figure 8:
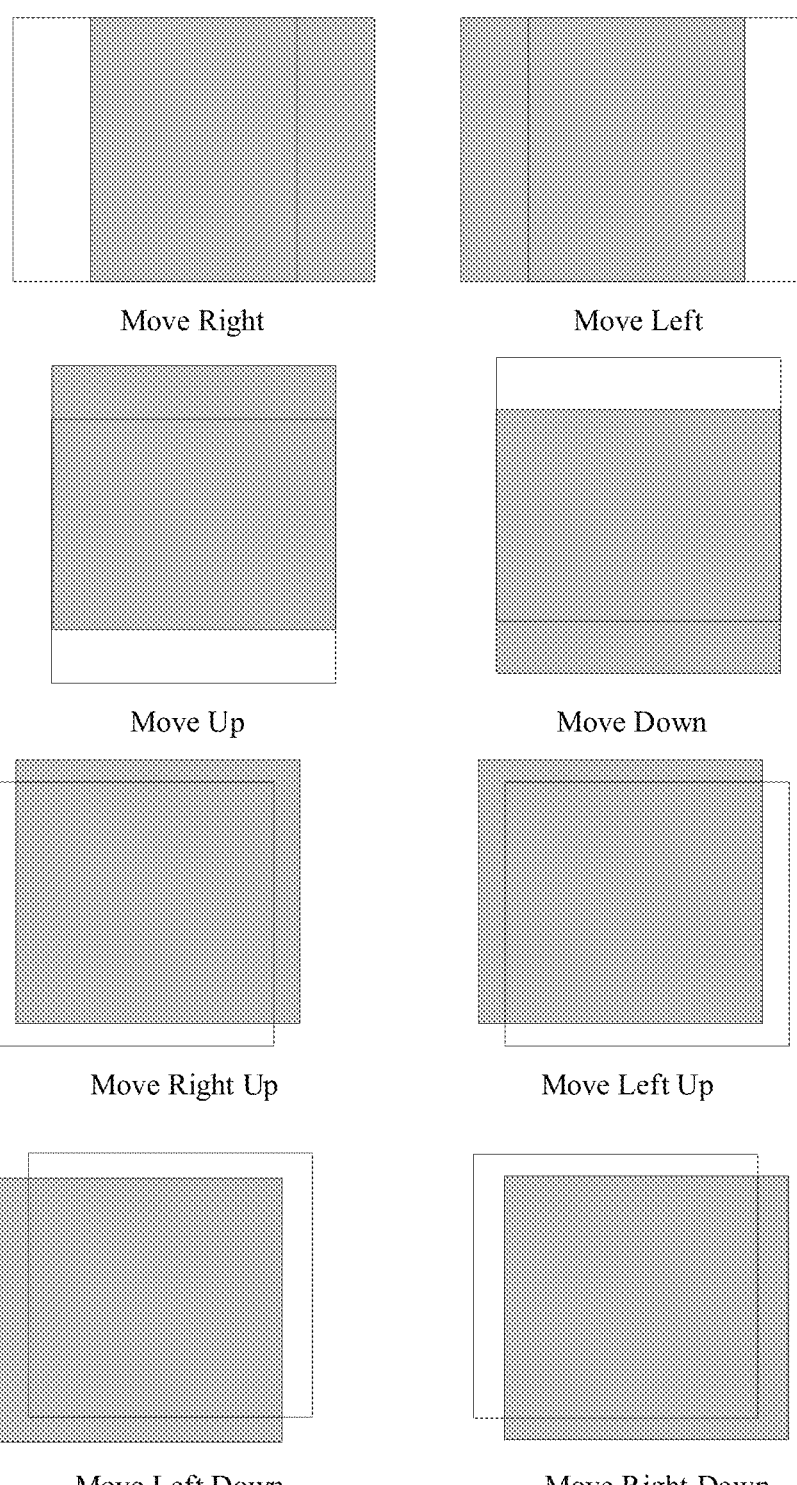
Figure 9:
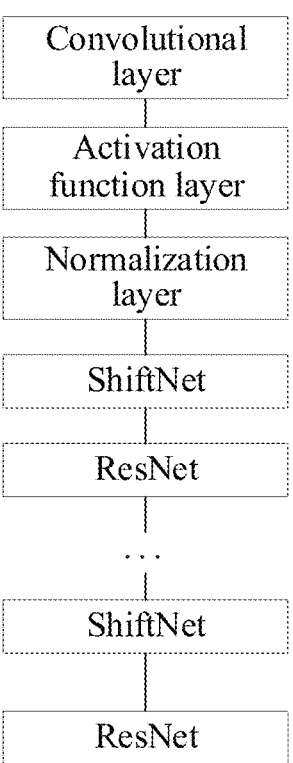
Figure 10:
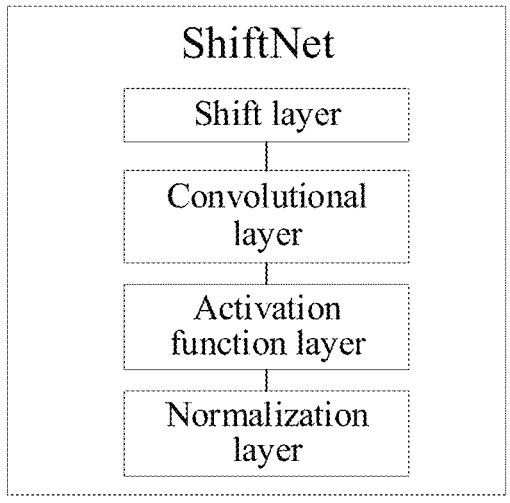
Figure 11:
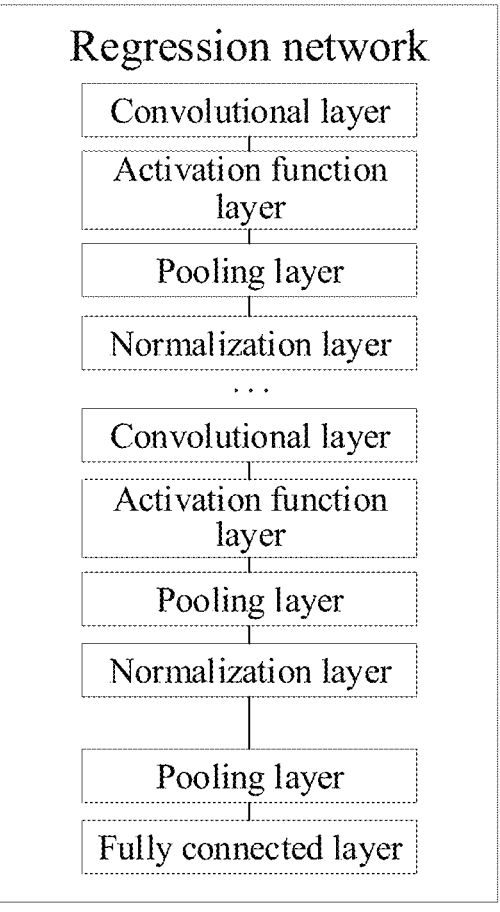
Figure 12:
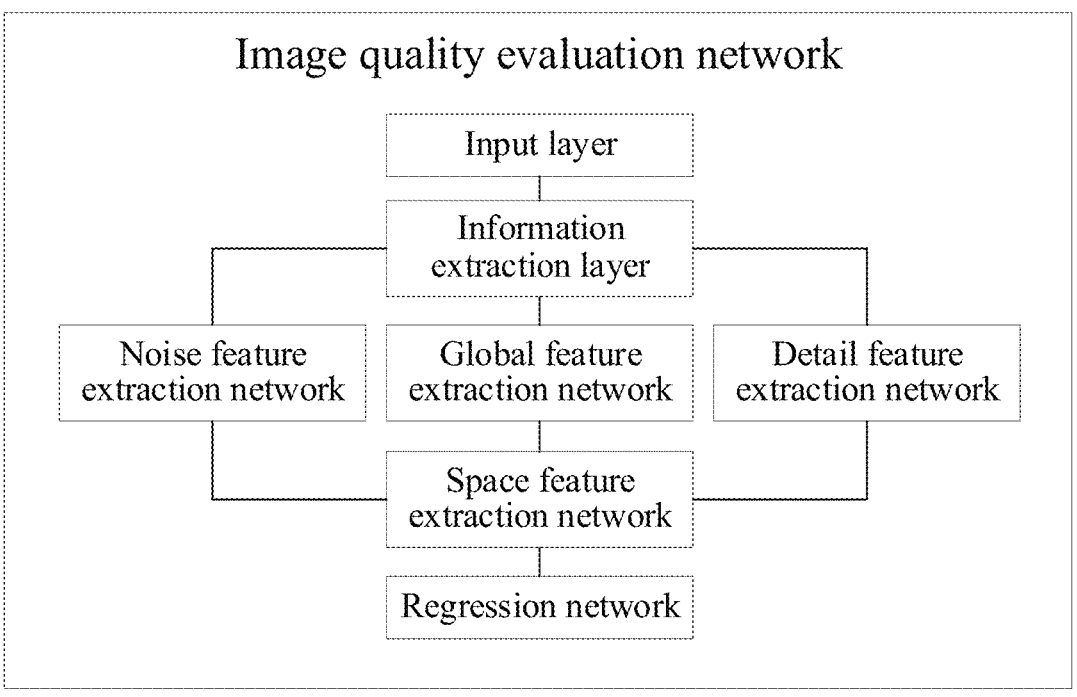
Figure 13:
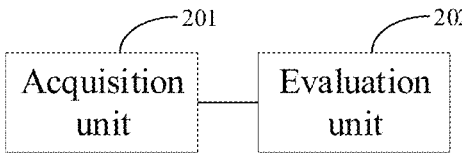
Figure 14:
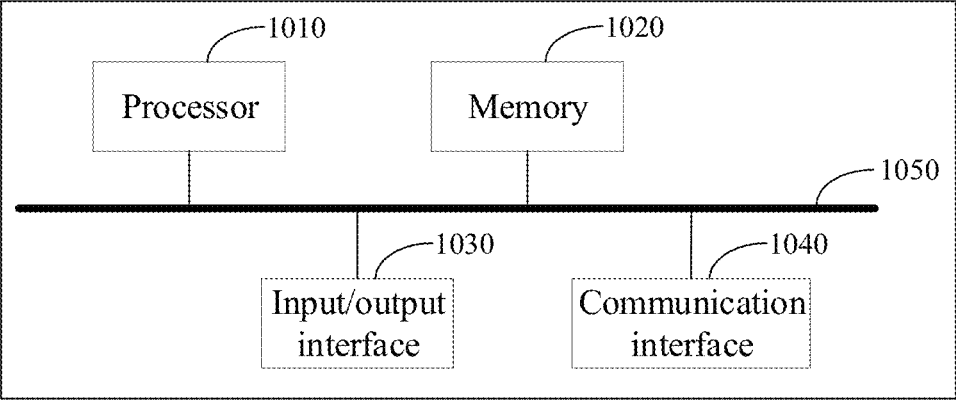

FIG. 1 is a schematic flowchart showing an image quality evaluation method according to an embodiment of the present invention;

FIG. 2 is a schematic diagram showing a principle of an image quality evaluation network according to an embodiment of the present invention;

FIG. 3 is a schematic flowchart showing an edge filtering feature extraction method according to an embodiment of the present invention;

FIG. 4 is a schematic flowchart showing a guided filtering feature extraction method according to an embodiment of the present invention;

FIG. 5 is a schematic diagram showing a structure of a feature extraction network according to an embodiment of the present invention;

FIG. 6 is a schematic diagram showing a principle of an image global feature extraction network according to an embodiment of the present invention;

FIG. 7 is a schematic diagram showing a principle of a first image feature extraction method according to an embodiment of the present invention;

FIG. 8 is a schematic diagram showing a principle of an image feature shift according to an embodiment of the present invention;

FIG. 9 is a schematic diagram showing a structure of a space feature extraction network according to an embodiment of the present invention;

FIG. 10 is a schematic diagram showing a structure of a ShiftNet layer according to an embodiment of the present invention;

FIG. 11 is a schematic diagram showing a structure of a regression network according to an embodiment of the present invention;

FIG. 12 is a schematic diagram showing a structure of an image quality evaluation network according to an embodiment of the present invention;

FIG. 13 is a schematic diagram showing a structure of an image quality evaluation apparatus according to an embodiment of the present invention;

FIG. 14 is a schematic diagram showing a hardware structure of a computer device configured with a method in the embodiments of the present invention according to an embodiment of the present invention.

DETAILED DESCRIPTION

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present invention. Rather, they are merely examples of apparatuses and methods consistent with some aspects of the present invention as detailed in the appended claims.

Currently, when image quality is evaluated, it is often manually evaluated. For example, the image quality is scored manually, and then the image quality is determined based on scores.

Images may be specifically video frames, so that the quality of a video may be determined by evaluating the quality of the video frames. However, such manual evaluation method is less efficient.

In order to solve the problem, the embodiments of the present invention provide an image quality evaluation method.

In the method, quality evaluation may be automatically performed on an input image by using a pre-trained image quality evaluation network, which, compared with manual evaluation of image quality, can improve the efficiency of quality evaluation, and reduce the labor cost.

Further, in the method, image features related to image quality in the image may be introduced into the image quality evaluation network for prediction, so as to improve the accuracy of image quality evaluation.

For example, noise feature information of the image may be introduced, and usually, the larger the noise of the image is, the lower the image quality is. The accuracy of the image quality evaluation network can be improved by introducing the noise feature information of the image.

For example, detail feature information of the image may be introduced, and usually, the more the details of the image are, the higher the image quality is. The accuracy of the image quality evaluation network can be improved by introducing the detail feature information of the image.

FIG. 1 is a schematic flowchart showing an image quality evaluation method according to an embodiment of the present invention.

An execution body of method processes is not limited, and may be a server or a client device.

The method processes may include the following steps.

At S101, a to-be-evaluated image is acquired.

At S102, the to-be-evaluated image is input into an image quality evaluation network to obtain an image quality evaluation result.

The image quality evaluation network may be pre-trained according to an image sample and its corresponding quality evaluation label.

In some embodiments, the image quality evaluation network may be configured to: extract a first image feature from the input image, perform a shift operation on the first image feature to acquire one or more second image features, and determine the image quality evaluation result by combining the first image feature and the acquired second image features.

A size of the second image features is the same as a size of the first image feature, and regions with identical values of features exist in different positions between the first image feature and the second image features.

In the method processes, quality evaluation may be automatically performed on the input image by using the pre-trained image quality evaluation network, which can improve the efficiency of quality evaluation, and reduce the labor cost.

In addition, in the method processes, shift results of the first image feature may be used for quality evaluation, so as to improve the comprehensiveness and accuracy of image quality evaluation.

Since a new image obtained by shifting an original image is the same as or similar to the original image in quality, multiple new images that are the same as or similar to the original image in quality may be obtained through the shift operation. Therefore, quality evaluation may be performed from multiple different views by using these new images and the original image, which improves the comprehensiveness and accuracy of quality evaluation.

It should be noted that, in an embodiment, since a video includes several video frame images, video quality may be reflected through quality of the several video frame images.

In some embodiments, quality evaluation may be performed on the several video frame images in the video through the above method processes, and then quality evaluation results of the video are determined by combining quality evaluation results of the several video frame images.

Specifically, for the entire video, quality evaluation results obtained in respective frames may be averaged to obtain final quality evaluation results of the entire video.

The method processes will be described in detail below.

I. Regarding Image Quality Evaluation Network

Specific structure or model algorithm of the image quality evaluation network is not limited in the method processes. In some embodiments, the image quality evaluation network may be an image convolutional network or a deep learning model.

A method of training the image quality evaluation network is not limited in the method processes.

In some embodiments, the image quality evaluation network may be trained by using an image sample and its corresponding quality evaluation label.

Specific forms of the quality evaluation label corresponding to the image sample are not limited in the embodiments.

In some embodiments, a form of the quality evaluation label may be a score, a quality grade or the like.

In some embodiments, the quality evaluation label may include results of quality evaluation performed from multiple different angles.

In some embodiments, the quality evaluation label may be determined by combining the results of quality evaluation in multiple different angles. Specifically, a final quality score may be determined by combining quality scores from multiple different angles.

Since the influence of image attributes on image quality is greater, the quality evaluation label may specifically include at least one of the following angles (viewpoints): image blurriness, image compression blockiness, image noise level, image luminance, image contrast, image color richness, image exposure, or the like. In an example, the quality evaluation label may include quality scores or quality grades in multiple angles.

In the embodiments, the image attributes may influence the image quality to some extent, so that performing quality evaluation from multiple different angles can improve the comprehensiveness and accuracy of quality evaluation.

In some embodiments, based on the image sample and the quality evaluation label, an output of the image quality evaluation network may include quality evaluation results in multiple angles, which is convenient to view in which angles the image quality is good and in which angles the image quality is poor.

For ease of understanding. FIG. 2 is a schematic diagram showing a principle of an image quality evaluation network according to an embodiment of the present invention.

The image quality evaluation network may output quality evaluation results in seven angles of image blurriness, image compression blockiness, image noise level, image luminance, image contrast, image color richness, and image exposure for a single input image.

In some embodiments, determining the image quality evaluation result by combining the first image feature and the acquired second image features includes: determining one or more image attribute evaluation results by combining the first image feature and the acquired second image features; determining the image quality evaluation result according to the determined image attribute evaluation results.

The image attribute evaluation results may include an evaluation result of at least one of the following image attributes: image blurriness, image compression blockiness, image noise level, image luminance, image contrast, image color richness, or image exposure.

In some embodiments, the determined image quality evaluation result may include one or more image attribute evaluation results.

For the labeling on the quality evaluation label, a method of labeling on the quality evaluation label corresponding to the image sample is not limited in the method processes.

Specifically, manual labeling method may be used to improve the accuracy of the quality evaluation label, or the labeling may be automatically performed directly by machine, or be performed by machine and manual combination.

In some embodiments, the image quality may be associated with multiple image attributes, such as image blurriness, image compression blockiness, image noise level, image luminance, image contrast, image color richness, and image exposure.

Attribute values may be directly calculated according to a formula, so that the image attribute values may be automatically calculated by machine, and further the quality evaluation label may be determined according to the calculated image attribute values.

In some embodiments, determining the quality evaluation label according to the calculated image attribute values may be specifically determining the quality evaluation label based on predetermined quality evaluation rules, or manually determining the quality evaluation label by manually viewing the calculated image attribute values and combining image contents, actual display effects and other conditions.

Compared with the method of manually directly viewing the image and determining the quality evaluation label, the quality evaluation label may be manually determined more conveniently and accurately based on the image attribute values automatically calculated by machine, which can improve the efficiency of determining the quality evaluation label, reduce the labor cost, and improve the accuracy of the quality evaluation label.

The preset quality evaluation rules are not limited in the embodiments. In some embodiments, the preset quality evaluation rules may include: image quality is negatively correlated with image blurriness, and image quality is negatively correlated with image noise level.

In some embodiments, the quality evaluation label may be automatically determined based on image attribute values of the image sample, or be manually determined based on image attribute values of the image sample.

Therefore, in some embodiments, a method of generating a training set of the image quality evaluation network may include: acquiring an unlabeled image sample; for the acquired unlabeled image sample, calculating corresponding image attribute value(s), and determining a corresponding image quality evaluation label according to the calculation result.

In some embodiments, the image quality evaluation label may be specifically manually or automatically determined according to the calculation results.

In the embodiments, the image attribute values of the image sample may be automatically calculated by machine to help label on the image quality evaluation label corresponding to the image sample, which can reduce the labor cost, increase the training efficiency, and improve the training effect on the image quality evaluation network.

In a specific embodiment, several images may be acquired, and then more image samples may be obtained by adjusting image attributes.

Specifically, adjustments in different degrees may be performed on attributes, such as image luminance, image contrast, image color saturation, image highlight, image shadow; and image blurriness, to obtain more image samples.

When an image sample is labeled, the labeling may be manually or automatically performed, or the automatic labeling and the manual labeling may be combined.

(1) Manual Labeling: Image Quality May be Evaluated Manually. Specifically, Quality Evaluation May be Manually Performed on Each Image Attribute Index.

Specifically, quality evaluation may be manually performed individually on 7 indexes (blurriness, blockiness, noise level, luminance, contrast, color richness, and exposure).

Of course, quality evaluation may be performed multiple times by different people on the same image sample, so as to improve the accuracy of quality evaluation.

(2) Automatic Labeling:

Since image attributes may be calculated through formulas, and the values may be mapped, automatic labeling for image quality can be achieved.

Values of image blurriness, image compression blockiness, image noise level, image luminance, image contrast, image color richness, and image exposure may be calculated through formulas, and the values may be mapped, so as to achieve the purpose of automatic labeling.

Specifically, how to calculate image attributes through formulas will be explained below:

Blurriness: A grayscale image is obtained through formulas Y=0.2126R+0.7252G+0.0722B (BT.709 data) and Y=0.2627R+0.678G+0.0593B (BT.2020 data), then an edge image e of the grayscale image is obtained through Laplacian operator, and blurriness of the image is obtained through a formula $$std(e) = \sqrt{\frac{1}{N}\left(\sum (e_{i,j} - \mu)^2\right)},$$

where $\mu$ indicates a mean value of e, i, j indicate pixel coordinates of the image, and N indicates a sum of the number of all pixels.

For videos that meet standards, a calculated blurriness value is mapped to 1, and an original video value is mapped to 0. For other videos, blurriness is automatically calculated, and a labeled value corresponding to the obtained value is obtained by using a mapping relationship. For example, if a calculation result of standard video blurriness is S1 (which is mapped to 1), and a calculation result of original video blurriness is S2 (which is mapped to 0), a mapping formula may be obtained:

$$Y = \frac{S_1}{S_1 - S_2}X - \frac{S_1}{S_1 - S_2} + 1,$$

where X indicates calculated blurriness, and Y indicates a labeled value of mapped blurriness.

Blockiness: An RGB image is first converted into a grayscale image, and then the grayscale image is divided into L×L blocks, where L is 8 by default. Differences between pixels in a last column and pixels in a second to last column of each block are calculated, and absolute values of the differences are added and summed to obtain an absolute sum (VIS); differences between pixels in a last column of each block and pixels in a first column of next block are calculated, and absolute values of the differences are added and summed to obtain an absolute sum (VOS); differences between pixels in a last row and pixels in a second to last row of each block are calculated, and absolute values of the differences are added and summed to obtain an absolute sum (HIS); differences between pixels in a last row of each block and pixels in a first row of next block are calculated, and absolute values of differences are added and summed to obtain an absolute sum (HOS). A final blockiness calculation formula is:

$$block = \frac{-10.38 + 17.86 * \frac{\sum (VIS + HIS)}{\sum (VOS + HOS)}}{2}.$$

A mapping relationship is the same as above.

Noise level: An RGB image is first converted into a grayscale image, then guided filtering is performed on the grayscale image to obtain a filtered image, and the original image and the filtered image are subjected to difference calculation to obtain a residual image c. Image noise level is obtained through a formula $$std(c) = \sqrt{\frac{1}{N}\left(\sum (c_{i,j} - \mu)^2\right)}.$$

A mapping relationship is the same as above.

Luminance: Y=0.2126R+0.7252G+0.0722B (BT.709 data) and Y=0.2627R+0.678G+0.0593B (BT.2020 data). A mean value of Y is calculated to obtain luminance. A mapping relationship is the same as above.

Contrast: An RGB image is first converted into a grayscale image. Image contrast information is obtained through a formula $$C_{std} = \sqrt{\frac{1}{MN-1}\left(\sum x_{i,j}^2 - \frac{1}{MN}\left(\sum x_{i,j}\right)^2\right)},$$

where M, N indicate width and height sizes of x, and i, j indicate coordinate position information of a pixel. A mapping relationship is the same as above.

Color richness: Color richness is calculated through the following formulas:

$$RG = |R - G|$$
$$YB = |0.5 * (R + G) - B|$$
$$stdR = \sqrt{std(RG)^2 + std(YB)^2}$$
$$meanR = \sqrt{mean(RG)^2 + mean(YB)^2}$$
$$color = stdR + 0.3 * meanR$$

where color indicates image color richness. A mapping relationship is the same as above.

Exposure: A grayscale image Y of an image is first obtained, then a mean value meanY thereof is calculated, and normalization is performed to obtain $$\overline{Y} = \frac{meanY}{2^{bit} - 1},$$

where bit represents a bit depth of the image, 8 bit video is divided by 255, and 10 bit data is divided by 1023. An exposure calculation formula is:

$$E_{xp} = e^{\frac{log_{10}(0.5)}{log_{10}(\overline{Y})}}.$$

A mapping relationship is the same as above.

(3) Combination of Automatic Labeling and Manual Labeling.

For multiple image samples obtained by adjusting the same image, image attribute values may be calculated through formulas, and the image attribute values are directly mapped to the image quality evaluation result.

However, for images with different contents, it is difficult to directly use the image attribute values as the image quality evaluation result.

For example, for image 1 captured at night and image 2 captured during the day, luminance of the image 2 is higher than luminance of the image 1. However, quality of the image 1 may be higher than quality of the image 2.

Therefore, the image quality evaluation result may be determined by combining multiple calculated image attribute values.

In addition, the plurality of calculated image attribute values may be provided to people, so that the image quality evaluation result may be manually determined by combining the image attribute values, which improves the accuracy of image quality evaluation.

The image quality evaluation result obtained from the above method may be used to train the image quality evaluation network.

A structure of the image quality evaluation network is not limited in the method processes, and specifically, it may be explained later.

II. First Image Feature

Specific contents in the first image feature are not limited in the method processes.

In some embodiments, the first image feature may include at least one of: an image noise feature, an image detail feature, an image global feature, or the like.

In the embodiments, the accuracy of image quality evaluation may be improved by using one or more image features included in the first image feature.

Methods of extracting the first image feature are not limited in the method processes.

In some embodiments, feature extraction may be performed directly on the input image. Specifically, a convolutional network may be used.

Since the first image feature may include one or more types of feature information, feature extraction may be performed on the input image separately by using different feature extraction networks, and then the extracted features are added to the first image feature.

In order to facilitate the extraction of specific feature information, in some embodiments, corresponding features in the image may be first highlighted, and then corresponding feature information is extracted.

For example, the image may be processed to reinforce edge information in the image, and further extract edge feature information from the image, so that the edge feature information can be better extracted, which improves the accuracy of image quality evaluation.

Therefore, in some embodiments, extracting the first image feature from the input image may include: acquiring preset information from the input image, and further extracting one or more image features from the predetermined information; adding the extracted image features to the first image feature.

In some embodiments, the predetermined information may include at least one of: an original image, image detail information, image noise information, image luminance information, image saturation information, or image hue (tone) information. The image detail information may include image edge information.

The image detail information may be used to highlight image details, which facilitates subsequent extraction of the image detail feature. The image noise information may be used to highlight image noise, which facilitates subsequent extraction of the image noise feature. All of the original image, the image luminance information, the image saturation information, and the image hue information belong to the image global feature, and thereby may be used to highlight the image global feature from multiple angles, which facilitates subsequent extraction of the image global feature.

In some embodiments, in order to improve the extraction effect on image features, features may be extracted from different preset information respectively by using different feature extraction networks, which reduces the influence between extraction processes of different image features during the training and using.

In some embodiments, further extracting one or more image features from the predetermined information may include: extracting image features from different predetermined information by using different feature extraction networks.

Methods of acquiring the image detail information are not limited in the method processes. In some embodiments, the image detail information may be extracted by edge filtering.

Therefore, in some embodiments, acquiring the predetermined information from the input image may include: performing edge filtering on the input image to extract the image detail information.

In a specific embodiment, edge filtering may be performed on the input image to extract image edge detail information, which facilitates better judgment on image blurriness/definition.

The edge filtering may be calculated through Sobel-x, Sobel-y, and Laplacian operators to obtain an edge image. FIG. 3 is a schematic flowchart showing an edge filtering feature extraction method according to an embodiment of the present invention.

A filtering kernel of Sobel-x may be:

$$f_{Sx} = \begin{bmatrix} 1 & 0 & -1 \\ 2 & 0 & -2 \\ 1 & 0 & -1 \end{bmatrix},$$

a filtering kernel of Sobel-y may be:

$$f_{Sy} = \begin{bmatrix} 1 & 2 & 1 \\ 0 & 0 & 0 \\ -1 & -2 & -1 \end{bmatrix},$$

and a filtering kernel of Laplacian may be:

$$f_{lap} = \begin{bmatrix} 0 & 1 & 0 \\ 1 & -4 & 1 \\ 0 & 1 & 0 \end{bmatrix}.$$

Methods of acquiring the image noise information are not limited in the method processes. In some embodiments, the image noise information may be extracted by guided filtering.

Therefore, in some embodiments, acquiring the predetermined information from the input image may include: performing guided filtering on the input image to obtain a denoised blurred image, and extracting the image noise information by combining the input image and the blurred image.

In a specific embodiment, guided filtering may be performed on the input image to obtain a denoised blurred image, and the image noise information is extracted by performing a subtraction operation on the denoised blurred image from the input image, which facilitates better judgment on image noise level.

FIG. 4 is a schematic flowchart showing a guided filtering feature extraction method according to an embodiment of the present invention.

Specifically, the input image may be subjected to guided filtering to obtain a denoised image, and then the denoised image is subtracted from the input image to obtain noise information.

The guided filtering is a linear shift variable filtering process, including guided image I, input image p, and output image q. The guided image I needs to be predetermined according to a specific application, or may be directly taken as the input image p. The guided image/and the input image p may be the same image. For an $i^{th}$ pixel in the output image, its calculation method may be expressed as: $q_i = \Sigma_j W_{ij}$ $(I)p_j$, where i and j indicate pixel labels, and $W_{ij}$ indicates filtering kernel function and is defined as:

$$W_{ij}(I) = \frac{1}{|\omega|^2} \sum_{k:(i,j)\in w_k} \left(1 + \frac{(1-\mu_k)(I_j-\mu_k)}{\sigma_k^2 + \varepsilon}\right),$$

where $w_k$ indicates a $k^{th}$ kernel function window, $|w|$ indicates the number of pixels in a window, $\mu_k$ and $$\sigma_k^2$$

indicate a mean value and a variance of the guided image/in a window, and $\varepsilon$ indicates a smoothing factor.

A smoothing image after guided filtering may be obtained through the above formulas, and noise information may be obtained by subtracting the smoothing image from the input image.

A specific structure of a feature extraction network is not limited in the method processes.

For the image detail information and the image noise information, different feature extraction networks may be respectively used to extract the image detail feature and the image noise feature, and the extracted image detail feature and image noise feature can be determined as a part of the first image feature.

In some embodiments, a detail extraction network may be used to extract the image detail information, which facilitates judgment on image blurriness; a noise extraction network may be used to extract the image noise information, which facilitates judgment on image noise level. The detail extraction network and the noise extraction network may use the same model architecture.

FIG. 5 is a schematic diagram showing a structure of a feature extraction network according to an embodiment of the present invention.

The feature extraction network may include cascaded convolutional layer, activation function layer, normalization layer, and multiple residual networks.

The activation function layer may be specifically a Relu layer, and the normalization layer may be specifically an Instance Normalization (IN) layer. ResNet is a residual network, and multiple omitted ResNet networks may be represented by suspension points.

In some embodiments, a feature extraction network for extracting the image global feature, or other feature extraction networks for extracting image features may use the network structure in FIG. 5.

Forms and extraction methods of the image global feature are not limited in the method processes.

In some embodiments, at least one of an original image, image luminance information, image saturation information, and image hue information may be acquired from the input image, and the image global feature is further extracted from the acquired information and is added to the first image feature.

In some embodiments, the original image, the image luminance information, the image saturation information, and the image hue information may be combined to facilitate subsequent extraction of the image global feature.

In some embodiments, since all of the image luminance information, the image saturation information, and the image hue information are extracted from the original image, in order to facilitate feature combination, features may be first extracted from the original image, and then the extracted features are combined with the image luminance information, the image saturation information, and the image hue information to facilitate subsequent further extraction of the image global feature.

In a specific embodiment, a global feature extraction network may be used to extract the image global feature.

FIG. 6 is a schematic diagram showing a principle of an image global feature extraction network according to an embodiment of the present invention.

For an image input into the global feature extraction network, image luminance information, image saturation information, and image hue information of the image may be first extracted.

L is image luminance information, S is image saturation information, and H is image hue information.

Their calculation formulas are as follows (the input image is RGB):

(1) Luminance Information:

$$L = 0.2126R + 0.7252G + 0.0722B(BT.709 \text{ data})$$

$$L = 0.2627R + 0.678G + 0.0593B(BT.2020 \text{ data})$$

(2) Saturation Information:

$$S=\max(R,G,B)-\min(R,G,B)$$

(3) Hue Information:

$$H = R - 0.5G - 0.5B$$

L, S and H are respectively obtained through the above formulas, and features may be extracted from the input image through the convolutional layer. The extracted features are combined with L, S and H for subsequent extraction of the image global feature.

Specifically, the image global feature may be extracted through a structure of a feature extraction network.

Since luminance information, saturation information, and hue information are global feature information of the image, the global feature information of the image may be added to the global feature extraction network, which can help the global feature extraction network better learn the image global feature.

In an embodiment, in a case where the image detail feature, the image noise feature and the image global feature are obtained from the input image, the image detail feature, the image noise feature and the image global feature may be stacked and combined to obtain the first image feature.

For ease of understanding, FIG. 7 is a schematic diagram showing a principle of a first image feature extraction method according to an embodiment of the present invention.

Image noise information, image detail information, image luminance information, image saturation information, and image hue information may be separately acquired from an input image.

Then, the image noise feature is extracted from the image noise information by using a noise feature extraction network.

The image detail feature is extracted from the image detail information by using a detail feature extraction network.

The image global feature is extracted from the image luminance information, the image saturation information, and the image hue information by using a global feature extraction network.

Finally, the image noise feature, the image detail feature and the image global feature are stacked and combined to obtain first image feature.

III. Second Image Features

In an embodiment, the second image features may be obtained by performing a shift operation on first image feature.

First, based on the first image feature, quality evaluation may be performed by using various features of an input image, such as the image detail feature and the image noise feature, which can improve the accuracy of image quality evaluation.

On the basis of the first image feature, the second image features are newly added for quality evaluation, which can improve the accuracy of image quality evaluation.

Specifically, since the second image features are obtained by performing a shift operation on the first image feature, the second image features may include a part of the first image feature, but their positions are different.

Therefore, the second image features may be the first image feature at different positions and angles, and the second image features are newly added for quality evaluation. Image features may be determined from multiple angles, which improves the comprehensiveness and accuracy of image quality evaluation.

For example, for an original image, when image quality evaluation is performed, 3 rows of pixels are shifted downwards, or 3 columns of pixels are shifted rightwards, which has less influence on image quality. The shifted image is the same as or similar to the original image in quality, so that the shifted image may be used to evaluate image quality from multiple positions and angles, which improves the comprehensiveness and accuracy of image quality evaluation.

Similarly, compared with the extracted first image feature, one or more second image features obtained through shift operation may be the first image feature at different positions and angles, and the evaluated image quality is same or similar, so that the image quality may be evaluated from multiple positions and angles, which improves the comprehensiveness and accuracy of image quality evaluation.

In some embodiments, a size of the second image features may be the same as a size of the first image feature, which can facilitate subsequent stacking and combination of the features to determine the image quality evaluation result, and can clarify positional relationships between values of features in the image features.

In some embodiments, regions with identical values of features exist in different positions between the first image feature and the second image features.

Regions where values of features between the first image feature and the second image features are same may be regions reserved by performing a shift operation on the first image feature. Therefore, positions of the values of features in the regions in the first image feature are different from positions of the values of features in the regions in the second image features after the first image feature is shifted. In this way, the first image features at different positions and angles (that is, the second image features) can be provided, which facilitates subsequent improvement of the comprehensiveness and accuracy of image quality evaluation.

Specific operation methods, directions, and shift distances of the shift operation are not limited in the method processes, as long as the regions with identical values of features exist in different positions between the first image feature and the second image features.

In some embodiments, a direction of the shift operation may be shifting leftwards, or rightwards, or upwards to the left, or downwards to the right, or the like.

In some embodiments, a shift distance of the shift operation may be shifting by one feature point, or by three feature points.

In some embodiments, in order to facilitate improvement of the comprehensiveness and accuracy of image quality evaluation, the shift distance of the shift operation may be limited, which can reduce the influence of the shift operation on image quality.

In some embodiments, the shift distance of the shift operation may be limited to be less than a predetermined distance. Specifically, the shift distance of the shift operation may be less than three feature points, so that the acquired second image features can reserve values of most of features in the first image feature, and further image quality evaluated on the second image features is the same as or similar to image quality evaluated on the first image feature.

In some embodiments, different shift operations may be performed on the first image feature to obtain different second image features.

Specifically, different shift operations may be different shift directions, or different shift distances.

For example, the first image feature may be shifted leftwards by one feature point to obtain a second image feature; the first image feature may be shifted leftwards by three feature points to obtain a second image feature; the first image feature may be shifted rightwards by two feature points to obtain a second image feature.

The number of the acquired second image features is not limited in the embodiments.

In some embodiments, as the number of the second image features increases, the first image features at multiple positions and angles may be acquired, which can improve the comprehensiveness and accuracy of image quality evaluation.

Specific shift operations will be explained below.

Since the shift operation is performed on the first image feature, shift results may include values of a part of features in the first image feature, and positions of the values of these features in the shift results are different from positions of the values of these features in the first image feature.

In addition, the shift results may further include default values due to the shift operation. Specifically, after values of a part of features in the first image feature are shifted, values of a part of features existing in the shift results are shifted, so that corresponding values are defaulted.

For ease of understanding, FIG. 8 is a schematic diagram showing a principle of an image feature shift according to an embodiment of the present invention.

The first image feature may be a white rectangle, and the gray rectangle may be a position after the first image feature is shifted.

The first image feature may be shifted by three feature points towards eight directions, including upwards, downwards, leftwards, rightwards, upwards to the left, downwards to the left, upwards to the right, and downwards to the right. It can be known that, after the shift, there are default parts in the shift results.

The gray region in a white rectangle is values of a part of features in the first image feature in the shift result. The white region in a white rectangle is default parts in the shift result.

Methods of processing these default parts are not limited in the method processes.

In some embodiments, the shift results including the default parts may be directly used as the second image features. Specifically, when the second image features are used, for values of features in the second image features after the first image feature is shifted, image quality at different positions and angles needs to be emphatically determined.

In some embodiments, predetermined values may be filled as the second image features for the default parts in the shift results, which facilitates subsequent calculation. A preset value may be specifically 0.

In some embodiments, the default parts in the shift results may be predicted as the second image features through image restoration algorithm or other algorithm. Since the restored image features are the same as or similar to original image features in quality, the comprehensiveness and accuracy of image quality evaluation may be improved.

In an embodiment, performing the shift operation on the first image feature to acquire the one or more second image features may include: performing a shift operation on features in a predetermined region in the first image feature to obtain one or more shift results; filling a predetermined value for a default part in each shift result to acquire the second image features having the same size as the first image feature.

The multiple shift operations can be performed by different way.

IV. Determination of the Image Quality Evaluation Result by Combining First Image Feature and Second Image Features Specific forms of the image quality evaluation result are not limited in the method processes. For specific explanation, reference may be made to the above embodiments.

In some embodiments, the image quality evaluation result may include one or more quality evaluation results for image attributes, or be determined according to one or more quality evaluation results for image attributes.

For example, the image quality evaluation result may include quality evaluation results in seven angles of image blurriness, image compression blockiness, image noise level, image luminance, image contrast, image color richness, and image exposure.

In some embodiments, determining the image quality evaluation result by combining the first image feature and the acquired second image features may include: determining one or more image attribute evaluation results are determined by combining the first image feature and the acquired second image features; determining the image quality evaluation result according to the determined image attribute evaluation results.

In the embodiments, quality evaluation may be performed on image attributes, which facilitates analysis of association between image quality and image attributes.

In addition, quality evaluation may be performed from multiple angles of image attributes, which can improve the comprehensiveness and accuracy of quality evaluation.

Methods of determining the image quality evaluation result are not limited in the method processes.

In some embodiments, the image quality evaluation result may be predicted directly from the first image feature and the second image features. Specifically, the prediction may be performed by using a fully connected network or a regression network.

In some embodiments, image features may be further extracted for the first image feature and the acquired second image features, and then image quality evaluation result is predicted for the extracted image features.

In some embodiments, space feature information may be further extracted by combining the first image feature and the first image features at multiple different positions and angles, so that the image quality evaluation result may be predicted by using the space feature information of the image.

The space feature information may be specifically features extracted by combining the first image features at multiple different positions and angles. Due to the introduction of different positions and angles, the image space information can be learned from feature extraction during the model training.

Specifically, model training may be performed by using an input of image features at multiple different positions and angles and an output of image quality.

Since image quality corresponding to the image features at multiple different positions and angles is same or similar, and contents included in these image features are same or similar, during the model training, the step of performing feature extraction on the image features at multiple different positions and angles can further improve the feature characterization capability, better characterize association relationships between the image features and the image quality, and increase the stability and efficiency of model training.

Therefore, space image features extracted from the first image features at multiple different positions and angles can better characterize association relationships between the first image features and the image quality, so as to improve the accuracy of image quality evaluation.

Therefore, in some embodiments, determining the image quality evaluation result by combining the first image feature and the acquired second image features may include:

further extracting space feature information of the image by combining the first image feature and the acquired second image features, and determining the image quality evaluation result according to the extracted space feature information.

In an embodiment, the first image features at different positions and angles may be acquired by performing a shift operation on the first image feature.

In some embodiments, the image quality evaluation result may be determined directly for the first image feature and the acquired first image features at different positions and angles.

In some embodiments, features may be further extracted from the first image feature and the acquired first image features at different positions and angles, and then the same step may be serially, continuously performed multiple times for the extracted features, so that the extraction effect on features can be improved.

In some embodiments, the image quality evaluation network includes N cascaded preset modules, where N≥2; for an $i^{th}$ predetermined module, $1 \leq i \leq N-1$, and an output of the $i^{th}$ predetermined module is cascaded to an input of an $(i+1)^{th}$ predetermined module.

In some embodiments, the predetermined modules may be configured to perform a shift operation on an input image feature to acquire one or more third image features, and further extract image features and output the image features by combining the input image feature and the acquired third image features, where a size of the third image features is the same as a size of the input image feature, and regions with identical values of features exist in different positions between the input image feature and the third image features.

Forms of the image feature extracted and output by the preset modules are not limited, and may be specifically space feature information.

In some embodiments, in the predetermined modules, the input image feature needs to be expanded to obtain one or more third image features; and multiple cascaded predetermined modules are subsequently present. In order to facilitate reduction of calculation columns of the preset modules, a size of the image features extracted and output by the predetermined modules may be limited.

Specifically, a size of the input image feature in the predetermined modules may be limited to be the same as a size of the output image feature.

In some embodiments, a size of image features may be specifically adjusted through normalization, and may be specifically performed through Batch Normalization (BN), Instance Normalization (IN), and Feature Normalization (FN).

In the predetermined modules, the shift operation is performed directly on the input image feature.

Therefore, in some embodiments, performing the shift operation on the first image feature to acquire the one or more second image features, and determining the image quality evaluation result by combining the first image feature and the acquired second image features may include: inputting the first image feature into a first predetermined module in the N cascaded predetermined modules to obtain an image feature output from an $N^{th}$ predetermined module; and determining the image quality evaluation result according to the image feature output from the $N^{th}$ predetermined module.

In the embodiments, the shift operation and feature extraction may be performed on the first image feature in multiple rounds through serial predetermined modules, which improves the extraction effect on features.

Specific structures of the predetermined modules are not limited in the embodiments. In some embodiments, a structure of the predetermined modules may be specifically a structure of ShiftNet.

In a specific embodiment, for the first image feature, image feature extraction may be better performed by using a space feature extraction network, combining image detail information, image noise information, and image global feature information in the first image feature, and fully utilizing the space feature information of the image.

FIG. 9 is a schematic diagram showing a structure of a space feature extraction network according to an embodiment of the present invention.

A convolutional layer, an activation function layer, a normalization layer, multiple ShiftNet layers, and multiple residual networks may be included. Multiple omitted Shift-Net layers and ResNet networks may be represented by suspension points.

In the ShiftNet layers, the shift operation and feature extraction may be performed on the input image feature, and the residual networks may further perform feature extraction.

FIG. 10 is a schematic diagram showing a structure of a ShiftNet layer according to an embodiment of the present invention.

A shift layer, a convolutional layer, an activation function layer, and a normalization layer may be included.

The shift layer may be used to perform a shift operation on the input image feature to obtain image features at multiple different positions and angles.

Therefore, in a case where an input of the shift layer is image features with a channel number being F, an output of the shift layer may be image features with a channel number being F*9, where 8 shift operations may be performed on the image features, and shift results are stacked and combined with the input image features.

Then, features may be further extracted through the convolutional layer, the activation function layer, and the normalization layer, where the image features with a channel number being F*9 may be normalized into the image features with a channel number being F in the normalization layer.

The main function of ShiftNet is that feature information is shifted by a small number of pixels in different directions, which can obtain the continuity of feature information between adjacent rows and columns, and facilitate better extraction of space feature information of the image.

For the space feature information output from the space feature extraction network, the image quality evaluation result may be further predicted by using a regression network.

FIG. 11 is a schematic diagram showing a structure of a regression network according to an embodiment of the present invention.

The regression network may include multiple groups of cascaded convolutional layer, activation function layer, pooling layer, and normalization layer, as well as final pooling layer and fully connected layer. Multiple groups of omitted cascaded convolutional layer, activation function layer, pooling layer, and normalization layer may be represented by suspension points.

The final pooling layer in the regression network may be a global maximum pooling layer, and the previous pooling layer may be specifically a maximum pooling layer.

The function of the regression network is that the previously extracted image feature information is further output as the image quality evaluation result.

For the structure of the regression network, if the image quality evaluation result include quality evaluation results at multiple angles of image attributes, output quantity of the fully connected layer in the regression network may be determined.

If the number of image attributes in the image quality evaluation result needs to be updated, the output quantity of the fully connected layer in the regression network may be directly updated.

For ease of understanding. FIG. 12 is a schematic diagram showing a structure of an image quality evaluation network according to an embodiment of the present invention.

An input layer, an information extraction layer, a detail feature extraction network, a global feature extraction network, a noise feature extraction network, a space feature extraction network, and a regression network may be included.

Image noise information, image detail information, image luminance information, image saturation information, and image hue information may be extracted from an input image by the information extraction layer.

Then, the image detail feature, the image global feature and the image noise feature of the input image may be extracted by the detail feature extraction network, the global feature extraction network, and the noise feature extraction network, respectively.

Further, the image detail feature, the image global feature and the image noise feature of the input image may be combined and input into the space feature extraction network, and space feature information is output through a shift operation.

Then, the image quality evaluation result may be predicted by the regression network for the input space feature information.

Corresponding to the method embodiments, the embodiments of the present invention further provide corresponding apparatus embodiments.

FIG. 13 is a schematic diagram showing a structure of an image quality evaluation apparatus according to an embodiment of the present invention.

The following units may be included:

an acquisition unit 201, configured to acquire a to-be-evaluated image; and an evaluation unit 202, configured to input the to-be-evaluated image into an image quality evaluation network to obtain an image quality evaluation result.

The image quality evaluation network is configured to extract a first image feature from the input image, perform a shift operation on the first image feature to acquire one or more second image features, and determine the image quality evaluation result by combining the first image feature and the acquired second image features.

A size of the second image features is the same as a size of the first image feature, and regions with identical values of features exist in different positions between the first image feature and the second image features.

In some embodiments, the image quality evaluation network is configured to: determine one or more image attribute evaluation results by combining the first image feature and the acquired second image features; determine the image quality evaluation result according to the determined image attribute evaluation results.

In some embodiments, the image quality evaluation network includes N cascaded predetermined modules, where $N \geq 2$; for an $i^{th}$ predetermined module, $1 \leq i \leq N-1$, and an output of the $i^{th}$ predetermined module is cascaded to an input of an $(i+1)^{th}$ predetermined module.

The predetermined modules are configured to perform a shift operation on input image feature to acquire one or more third image features, and further extract image features and output the image features by combining the input image feature and the acquired third image features, where a size of the third image features is the same as a size of the input image feature, and regions with identical values of features exist in different positions between the input image feature and the third image features.

The image quality evaluation network is configured to: input the first image feature into a first predetermined module in the N cascaded predetermined modules to obtain an image feature output from an $N^{th}$ predetermined module; determine the image quality evaluation result according to the image feature output from the Nun predetermined module.

In some embodiments, the image quality evaluation network is configured to: perform a shift operation on a feature in a predetermined region in the first image feature to obtain one or more shift results; fill a predetermined value for a default part in each shift result to acquire the second image features having the same size as the first image feature.

In some embodiments, the image quality evaluation network is configured to: further extract space feature information of the image by combining the first image feature and the acquired second image features, and determine the image quality evaluation result according to the extracted space feature information.

In some embodiments, the first image feature includes at least one of: an image detail feature, an image noise feature, or an image global feature.

In some embodiments, the image quality evaluation network is configured to: acquire predetermined information from the input image, and further extract image features from the predetermined information; add the extracted image features to the first image feature, where the predetermined information includes at least one of: an original image, image detail information, image noise information, image luminance information, image saturation information, or image hue information.

In some embodiments, the image quality evaluation network is configured to: perform edge filtering on the input image to extract the image detail information; and/or perform guided filtering on the input image to obtain a denoised blurred image, and extract the image noise information by combining the input image and the blurred image.

In some embodiments, the image quality evaluation network is configured to: extract image features from different predetermined information by using different feature extraction networks.

In some embodiments, a method of generating a training set of the image quality evaluation network includes: acquiring an unlabeled image sample; for the unlabeled image sample, calculating corresponding image attribute values, and determining a corresponding image quality evaluation label according to the calculation result.

For explanation of the apparatus embodiments, reference may be made to the method embodiments.

The embodiments of the present invention further provide a computer device, including at least a memory, a processor, and a computer program stored in the memory and runnable on the processor, where the program is executed by the processor to implement any one of the method embodiments.

The embodiments of the present invention further provide an electronic device, including: at least one processor; and a memory connected in communication with the at least one processor, where the memory stores instructions executable by the at least one processor to enable the at least one processor to implement any one of the method embodiments.

FIG. 14 is a schematic diagram showing a hardware structure of a computer device configured with a method in the embodiments of the present invention according to an embodiment of the present invention. The device may include: a processor 1010, a memory 1020, an input/output interface 1030, a communication interface 1040, and a bus 1050. The processor 1010, the memory 1020, the input/output interface 1030 and the communication interface 1040 implement communication connection between each other inside the device through the bus 1050.

The processor 1010 may be implemented by using a common CPU (Central Processing Unit), a microprocessor, an ASIC (Application Specific Integrated Circuit), or one or more integrated circuits, etc. and used to execute relevant programs to implement the technical solutions provided by the examples of the present invention.

The memory 1020 may be implemented in the form of a ROM (Read Only Memory), a RAM (Random Access Memory), a static storage device, a dynamic storage device, and the like. The memory 1020 may store an operating system and other application programs, and when the technical solutions provided by the examples of the present invention are implemented by software or firmware, the relevant program code is stored in the memory 1020, and the processor 1010 may invoke and perform the relevant program code.

The input/output interface 1030 is configured to connect the input/output module to implement information input and output. The input/output module (not shown in the drawing) may be configured in a device as a component, and may also be external to the device to provide corresponding functions. The input device may include a keyboard, a mouse, a touch screen, a microphone, various types of sensors, etc. The output device may include a display, a speaker, a vibrator, an indicator, etc.

The communication interface 1040 is configured to connect to a communication module (not shown in the drawing) to implement communication interaction between the present device and other devices. The communication module may implement communication in a wired manner (for example, USB, network wire, etc.), and may also implement communication in a wireless manner (for example, mobile network, WIFI, Bluetooth, etc.).

The bus 1050 includes a path for transmitting information between various components (such as the processor 1010, the memory 1020, the input/output interface 1030, and the communication interface 1040) of the device.

It should be noted that, although the foregoing device merely shows the processor 1010, the memory 1020, the input/output interface 1030, the communication interface 1040, and the bus 1050, in a specific implementation process, the device can further include other components necessary to implement normal operation. In addition, a person skilled in the art may understand that the above-described device may also include only components necessary for implementing the examples of the present invention, and not necessarily all components shown in the drawing.

The embodiments of the present invention further provide a computer readable storage medium having a computer program stored thereon, where the program is executed by a processor to implement any one of the method embodiments.

Computer readable media include permanent and non-permanent, removable and non-removable media. Any method or technology can be used to implement information storage. The information may be computer readable instructions, data structures, modules of programs, or other data. Examples of storage media of a computer include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, Compact Disc Read-Only Memory (CD-ROM), digital versatile disc (DVD) or other optical storage, magnetic cassette, a magnetic disk storage or other magnetic storage device or any other non-transmission medium which can be used to store, information that can be accessed by the computer device. According to the definitions herein, the computer readable medium does not include transitory media such as a modulated data signal and carrier wave.

It can be seen from the description of the above embodiments that a person skilled in the art can clearly understand that the examples of the present invention can be implemented by software and a necessary universal hardware platform. Based on such understanding, the technical solutions of the examples of the present invention essentially or the part contributing to the prior art may be embodied in the form of a software product. The computer software product may be stored in a storage medium, such as a ROM/RAM, a magnetic disk, an optical disk, and the like, and include several instructions for enabling a computer device (such as a personal computer, a server, or a network device, etc.) to execute the method described in each example or some part of the examples of the present invention.

The system, apparatus, module or unit set forth in the foregoing examples may be specifically implemented by a computer chip or an entity, or implemented by a product having a certain function. A typical implementation device is a computer, and a specific form of the computer may be a personal computer, a laptop computer, a cellular phone, a camera phone, a smart phone, a personal digital assistant, a media player, a navigation device, an e-mail transceiver device, a game console, a tablet computer, a wearable device, or a combination of any of these devices.

Various examples in the specification are described in a progressive manner, and same or similar parts in the various examples may be referred to for each other, and each example focuses on the differences from other examples. Especially, for the apparatus, since the apparatus examples is basically similar to the method examples, the description is simplified, and reference may be made to some of the description of the method examples. The apparatus examples described above are merely schematic, in which the modules described as separate components may or may not be physically separated, and the functions of the modules may be implemented in one or more software and/or hardware when solutions of the examples of the present invention are implemented. Alternatively, some or all of the modules may be selected according to actual needs to implement solutions of the examples of the present disclosure. A person of ordinary skill in the art would understand and implement without creative efforts.

The above are only specific examples of the embodiments of the present invention. It should be noted that, for those of ordinary skill in the art, several improvements and modifications may be made without departing from the principle of the embodiments of the present invention, and these improvements and modifications should be regarded as falling within the protection scope of the embodiments of the present invention.

In the present invention, terms "first" and "second" are used only for descriptive purposes, and cannot be understood as indicating or implying relative importance. Terms "plurality", "multiple" or "several" means two or more, unless otherwise clearly defined.

Other embodiments of the present invention will be readily apparent to those skilled in the art after considering the specification and practicing the contents disclosed herein. The present invention is intended to cover any variations, uses, or adaptations of the present invention, which follow the general principle of the present invention and include common knowledge or conventional technical means in the art that are not disclosed in the present invention. The specification and examples are to be regarded as illustrative only. The true scope and spirit of the present invention are pointed out by the following claims.

It is to be understood that the present invention is not limited to the precise structures that have described and shown in the drawings, and various modifications and changes can be made without departing from the scope thereof. The scope of the invention is to be limited only by the appended claims.

The invention claimed is:

1. An image quality evaluation method, comprising:

acquiring an input image; and inputting the input image into an image quality evaluation network to obtain an image quality evaluation result, wherein the image quality evaluation network is configured to extract a first image feature from the input image, perform a shift operation on the first image feature to acquire one or more second image features, and determine the image quality evaluation result by combining the first image feature and the acquired second image features;

wherein a size of each of the second image features is the same as a size of the first image feature, and regions with identical values of features exist in different positions between the first image feature and the second image features;

wherein the image quality evaluation network comprises N cascaded predetermined modules, wherein N≥2; for an $i^{th}$ predetermined module, $1 \leq i \leq N-1$, and an output of the $i^{th}$ predetermined module is cascaded to an input of an $(i+1)^{th}$ predetermined module;

the predetermined modules are configured to perform a shift operation on an input image feature to acquire one or more third image features, and further extract image features by combining the input image feature and the acquired third image features and output the image features, wherein a size of each of the third image features is the same as a size of the input image feature, and regions with identical values of features exist in different positions between the input image feature and the third image features;

performing the shift operation on the first image feature to acquire the one or more second image features, and determining the image quality evaluation result by combining the first image feature and the acquired second image features comprises:

inputting the first image feature into a first predetermined module in the N cascaded predetermined modules to obtain an image feature output from an $N^{th}$ predetermined module; and determining the image quality evaluation result according to the image feature output from the $N^{th}$ predetermined module.

2. The method according to claim 1, wherein determining the image quality evaluation result by combining the first image feature and the acquired second image features comprises:

determining one or more image attribute evaluation results by combining the first image feature and the acquired second image features; and determining the image quality evaluation result according to the determined image attribute evaluation results.

3. The method according to claim 1, wherein performing the shift operation on the first image feature to acquire the one or more second image features comprises:

performing a shift operation on features in a predetermined region in the first image feature to obtain one or more shift results; and filling a predetermined value for a default part in each of the one or more shift results to acquire the one or more second image features each having the same size as the first image feature.

4. The method according to claim 1, wherein determining the image quality evaluation result by combining the first image feature and the acquired second image features comprises:

further extracting space feature information of the input image by combining the first image feature and the acquired second image features, and determining the image quality evaluation result according to the extracted space feature information.

5. The method according to claim 1, wherein the first image feature comprises at least one of: an image detail feature, an image noise feature, or an image global feature.

6. The method according to claim 1, wherein extracting the first image feature from the input image comprises:

acquiring predetermined information from the input image, and further extracting one or more image features from the predetermined information; and adding the extracted image features to the first image feature;

wherein the predetermined information includes at least one of: an original image, image detail information, image noise information, image luminance information, image saturation information, or image hue information.

7. The method according to claim 6, wherein acquiring the predetermined information from the input image comprises:

performing edge filtering on the input image to extract the image detail information; and/or performing guided filtering on the input image to obtain a denoised blurred image, and extracting the image noise information by combining the input image and the blurred image.

8. The method according to claim 6, wherein further extracting one or more image feature from the predetermined information comprises:

extracting one or more image features from different predetermined information by using different feature extraction networks.

9. The method according to claim 1, wherein a training set of the image quality evaluation network is generated by:

acquiring an unlabeled image sample;

for the unlabeled image sample, calculating one or more corresponding image attribute values; and determining a corresponding image quality evaluation label according to the calculation result.

10. An electronic device, comprising:

at least one processor; and a memory connected in communication with the at least one processor, wherein the memory stores instructions executable by the at least one processor to enable the at least one processor to implement the method according to claim 1.

11. A non-transitory computer readable storage medium storing a computer program, wherein the computer program is executed by a processor to implement the method according to claim 1.

\*   \*   \*   \*   \*